United States Patent

Fitton et al.

[15] 3,674,825
[45] July 4, 1972

[54] HALO(ARYL)METAL COMPOUNDS AND METHOD OF PREPARATION

[72] Inventors: Peter S. Fitton; Edward A. Rick, both of Charleston, W. Va.

[73] Assignee: Union Carbide Corporation, New York, N.Y.

[22] Filed: Sept. 30, 1969

[21] Appl. No.: 862,525

[52] U.S. Cl. .................260/429 R, 252/431 P, 260/242, 260/270 R, 260/299, 260/439 R, 260/439 CY
[51] Int. Cl. ..............................C07f 15/00, C07f 15/04
[58] Field of Search .................................260/429, 439

[56] References Cited

UNITED STATES PATENTS

| | | | |
|---|---|---|---|
| 3,097,225 | 7/1963 | Dubeck | 260/439 |
| 3,450,730 | 6/1969 | Scheben et al. | 260/429 |

OTHER PUBLICATIONS

Calvin et al. Chem. and Ind. (London) 1958, p. 160–161
Noller Chemistry of Organic Compounds, W. B. Saunders Co., Philadelphia, 3rd ed. 1966, p. 472–473
Hopton et al. J. Chem. Soc. (A) 1966, p. 1,326–1,330
Coates Organo Metallic Compounds John Wiley & Sons, N.Y., N.Y. 1960, p. 321–323

*Primary Examiner*—Tobias E. Levow
*Assistant Examiner*—A. P. Demers
*Attorney*—Louis C. Smith, Jr. and Paul A. Rose

[57] ABSTRACT

Halo(aryl)metal compounds are readily produced when a Group VIII metal or a compound or complex of a Group VIII metal is reacted with an aryl halide substituted with electron-withdrawing groups. The compounds have utility as catalysts for the oxidation of methyl benzenes and as intermediates in the arylation of olefins.

22 Claims, No Drawings

HALO(ARYL)METAL COMPOUNDS AND METHOD OF PREPARATION

This invention relates to the preparation of halo(aryl)metal compounds from relatively inexpensive haloaryls.

The development of the chemistry of the haloaryl compounds of the Group VIII metals has been delayed in the past by the lack of convenient methods of synthesis of these compounds. A few isolated examples have been described in which compounds were prepared by the action of Grignard reagents and lithium aryls on halogen-containing compounds of the Group VIII metals, but the yields were low and the products were difficult to isolate and purify. Since the Grignard and lithium compounds are also expensive and often very difficult to prepare, these methods are not very attractive.

In a previous application, Ser. No. 778,337, filed December 31, 1968, a method was disclosed for preparing iodo(phenyl)palladium(II) compounds by the oxidative addition of iodobenzene to palladium(0) compounds. While this method was found to be of great use for the preparation of iodo(phenyl)metal compounds, it was also found that to affect reaction between the more inexpensive, but less reactive chlorobenzene, much higher temperatures had to be employed and decomposition of the metal(0) compound often occurred.

It has now been found that aryl halides substituted with electron-withdrawing groups are much more reactive in these reactions than the unsubstituted aryl halides and aryl halides substituted with electron-donating groups. Thus under similar conditions, iodobenzene will react rapidly at ambient temperatures with tetrakis(triphenylphosphine)palladium(O), bromobenzene will react rapidly with tetrakis(triphenylphosphine)palladium(O), at 80° C, but chlorobenzene will not react even at 135°. However, ortho- and para-bromochlorobenzenes will react rapidly at 60° and para-nitrochlorobenzene will react at 80°. This increased reactivity means that milder conditions, i.e., lower temperatures, can be used, which is of great importance since many of the starting materials and products will decompose at higher temperatures.

The general reaction can be represented by the following equation

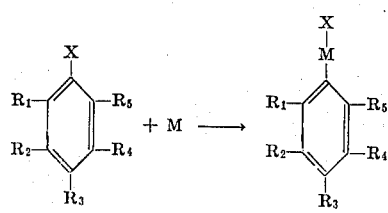

where X is a halogen selected from the group consisting of chlorine, bromine and iodine and M is a Group VIII metal or a compound or a complex of Group VIII metal described below.

The substituents $R_1$ through $R_5$ can be any of the substituents common to benzene chemistry such as hydrogen, alkyl, aryl, alkoxy, aryloxy, amino and the like, and any two of $R_1$ through $R_5$ can form part of another ring system such as naphthalene or phenanthene. However, at least one of the substituents $R_1$ through $R_5$ must be an electron-withdrawing group. The number of these electron-withdrawing groups is critical only in that the net effect of the substituents $R_1$ through $R_5$ must be to lower the electron-density of the ring. Typical electron-withdrawing groups are nitro, nitroso, cyano, carbonyl, carboalkoxy, carboxamide, N,N-dialkylcarboxamide, N,N-diarylcarboxamide, aryl, aroyl and the like. If desired the electron-withdrawing group can also be halogen, but where there is a plurality of halogens, the Group VIII metal inserts between the aromatic ring and the halogen with the highest molecular weight. Thus 4-bromochlorobenzene will react to give a bromo-(4-chlorophenyl)metal compound and 2-chloroiodobenzene will react to give a iodo(2-chlorophenyl)metal compound.

Exemplary aryl halides that can be used in the process of the instant invention are 1,2-dichlorobenzene; 1,3-dichlorobenzene; 1,4-dichlorobenzene; 1,3,5-trichlorobenzene; 1,3-dibromobenzene; 2-nitrochlorobenzene, 2-nitroiodobenzene, 3-nitroiodobenzene, 4-nitrobromobenzene, 2,3-dinitrochlorobenzene; 2,3-dinitroiodopenzone; 2,4-dinitrobromobenzene; 2,5-dinitrochlorobenzene; 2,6-dinitrobromobenzene; 2,4,6-trinitrochlorobenzene; 2-cyanobromobenzene, 3-cyanobromobenzene; 3-cyanochlorobenzene; 2,4-dicyanochlorobenzene; 4-cyanobromobenzene; 2,6-dicyanochlorobenzene, 2,4,6-tricyanobromobenzene; methyl 2-bromobenzoate, ethyl 2-chlorobenzoate, methyl 3-bromobenzoate, methyl 4-bromobenzoate, 2-chlorobenzotrifluoride, 4-chlorobenzotrifluoride, 3-bromobenzotrifluoride, 2-bromobenzotrifluoride, 3-bromobenzotrifluoride, 2-bromobenzotrifluoride, 2-chloroacetophenone, 4-chloroacetophenone, 3-chlorobenzophenone, 2-bromobenzophenone, 4-bromobenzophenone, 2,4-dichlorobenzophenone; 2,6-dichlorobenzophenone; 3,5-dichlorobenzophenone; 1,2-dichloro-3-nitrobenzene; 1,4-dichloro-2-nitrobenzene, 2-bromo-3-nitrochlorobenzene, 2-bromo-5-nitrochlorobenzene, 4-bromo-2-nitrochlorobenzene; 2,3-dichlorobenzonitrile; 2,5-dichlorobenzonitrile; 1-bromo-2-chlorobenzonitrile, 2-chloro-3-nitrobenzonitrile, 2-chloro-5-nitrobenzonitrile, 2-chloro-3nitrotoluene, 2-chloro-5-nitrotoluene; 1,2-diiodobenzene; 1,3-diiodobenzene; 1,4-diiodobenzene, 1-bromo-2-chlorobenzene, 1-bromo-3-chlorobenzene, 1-bromo-4-chlorobenzene, 1-bromo-3,5-dichlorobenzene, 1-chloro-3,5-dibromobenzene, 2-nitrobromobenzene, 3-nitrochlorobenzene, 4-nitrochlorobenzene; 2,3-dinitrobromobenzene; 2,4dinitrobromobenzene;2,6-dinitrochlorobenzene; 2,6-dinitrobromobenzene; 2,4,6-trinitrobromobenzene, 2-cyanochlorobenzene; 2,3-dicyanochlorobenzene; 3-cyanobromobenzene, 4-cyanochlorobenzene; 2,5-dicyanochlorobenzene; 2,6-dicyanobromobenzene, methyl 2-chlorobenzoate, ethyl 3-chlorobenzoate, methyl 3-chlorobenzoate, methyl 4-chlorobenzoate, ethyl 4-bromobenzoate, 3-chlorobenzotrifluoride, 2-bromobenzotrifluoride, 4-bromobenzotrifluoride, 3-chloroacetophenone, 2-bromoacetophenone, 4-chlorobenzophenone, 3-bromobenzophenone; 2,3-dichlorobenzophenone; 2,5-dichlorobenzophenone; 3,4-dichlorobenzophenone; 1,2-dichloro-3-nitrobenzene; 1,2-dichloro-4-nitrobenzene; 1,4-dichloro-3-nitrobenzene, 2-bromo-6-nitrochlorobenzene, 4-bromo-3-nitrochlorobenzene; 2,4-dichlorobenzonitrile; 2,6-dichlorobenzonitrile, 1-bromo-4-chlorobenzonitrile, 2-chloro-4-nitrobenzonitrile, 2-chloro-6-nitrobenzonitrile, 2-chloro-4-nitro-toluene, 2-chloro-6-nitrotoluene, and the like.

M in the above equation can be any of the Group VIII metals: iron, ruthenium, osmium, nickel, palladium, or platinum, or a complex of iron(O), ruthenium(O), osmium(O), nickel(O), palladium(O) or platinum(O), or a compound or complex of cobalt(I), rhodium(I) or iridium(I).

For those low valent Group VIII metals possessing zero-valent active forms, ie.e., iron(O), ruthenium(O), osmium(O), nickel(O), palladium(O) and platinum(O), highly activated, finely divided metals can be used directly such as in freshly precipitated metal form or on supports, to react with aryl halides to form Group VIII metal halo(aryl) compounds. This method is advantageous for the preparation of active intermediates in further reactions. However, if it is desired to isolate the halo(aryl) metal it is advantageous to stabilize the metal by using neutral ligands.

The Group VIII metals and metal compounds used in this invention can be stabilized with neutral ligands containing olefinic unsaturation and or carbon monoxide and/or at least one of the following trivalent donor atoms: N, P, As, and Sb, in which the donor atoms, carbon monoxide or olefinic unsaturation are capable of occupying positions in the co-ordination sphere of the metal. The exact structure of the ligands is not critical. The only requirement is that the ligands be capable of stabilizing the metal species. The ligands can be monodentate or polydentate. Preferably the ligands are monodentate or bidentate. The monodentate ligands contain one atom or group which can occupy one position in the co-ordination sphere of the low valent metal. The bidentate ligands contain two atoms or groups, each of which can occupy a position in the comordination sphere of the metal. The number of ligands occupying positions in the co-ordination sphere will, of course, depend on whether monodentate or bidentate ligands are complexed with the metal. One bidentate ligand is obviously the equivalent of two monodentate ligands. The low valent metals are stabilized with the equivalent of 2 to 5 monodentate ligands.

The low valent metal complexes with monodentate ligands are those of the type $M(L)_x$, M being any of Os(O), Ru(O), Fe(O), Pt(O), Pd(O), or Ni(O), or of the type $M(L)_xY$ when M is Ir(I), Rh(I) or Co(I), L being the ligand which is defined as below, Y being a counter ion and $x$ is an integer of from 2 to 5.

The following are illustrative of the types of monodentate ligands (L) which can be employed in the invention:

$PR^6_2R^7$ where $R^6$ and $R^7$ can be the same or different and are hydrocarbyl groups such as alkyl, aryl, aralkyl, alkaryl, cycloalkyl, alkylcycloalkyl, cycloalkylalkyl and the like.

$PR^6_2(OR^7)$ where $R^6$ and $R^7$ can be the same or different and are hydrocarbyl groups such as alkyl, aryl, aralkyl, alkaryl, cycloalkyl, alkylcycloalkyl, cycloalkylalkyl and the like;

$PR^6(OR^7)_2$ where $R^6$ and $R^7$ can be the same or different and are hydrocarbyl groups such as alkyl, aryl, aralkyl, alkaryl, cycloalkyl, alkylcycloalkyl, cycloalkylalkyl and the like;

$P(OR^6)_3$ where $R^6$ is a hydrocarbyl group such as alkyl, aryl, aralkyl, alkaryl, cycloalkyl, alkylcycloalkyl, cycloalkylalkyl and the like;

$AsR^6_3$ where $R^6$ is a hydrocarbyl group such as alkyl, aryl, aralkyl, alkaryl, cycloalkyl, alkylcycloalkyl, cycloalkylalkyl, and the like;

$SbR^6_3$ where $R^6$ is a hydrocarbyl group such as alkyl, aryl, aralkyl, alkaryl, cycloalkyl, alkylcycloalkyl, cycloalkylalkyl, and the like.

$R^6-N=C$ where $R^6$ is a hydrocarbyl group such as alkyl, aryl, aralkyl, alkaryl, cycloalkyl, alkylcycloalkyl, cycloalkylalkyl and the like.

$R^6-C=N$ where $R^6$ is a hydrocarbyl group such as alkyl, aryl, aralkyl, alkaryl, cycloalkyl, alkylcycloalkyl, cycloalkylalkyl and the like;

compounds containing olefinic unsaturation, preferably hydrocarbons, and preferably containing from two to about eight carbon atoms, e.g., ethylene, cyclooctene, norbornene and the like;

heterocyclic bases, such as the heterocyclic amine, pyridine, and the like.

In the above formulas for L and $R^6$ or $R^7$ does not contain more than about 12 carbon atoms and preferably contains up to about six carbon atoms. The total number of carbon atoms in L generally does not exceed 36 and preferably does not exceed 18.

Illustrative of the alkyl groups are methyl, ethyl, propyl, butyl, pentyl, hexyl, decyl, and the like. Illustrative of the aryl groups are phenyl and naphthyl. Illustrative of the alkaryl groups are benzyl and xylyl. Illustrative of the alkaryl groups are tolyl and methylnaphthyl. Illustrative of the cycloalkyl groups are cyclobutyl, cyclopentyl, cyclohexyl, cyclooctyl and the like. Illustrative of the alkylcycloalkyl groups are the cycloalkyl groups which contain from one to about three of any one or mixture of the above alkyl groups as substituents on the cycloalkyl ring. Illustrative of the cycloalkylalkyl groups are the alkyl groups listed above which contain one or two of the cycloalkyl groups listed above as substituents.

Illustrative of the monodentate ligands which can be complexed with the low valent Group VIII metals are carbon monoxide, the trihydrocarbylphosphines such as the trialkylphosphines, e.g., trimethylphosphine, triethylphosphine, tripropylphosphine, tributylphosphine, and the like; the triarylphosphines, e.g., triphenylphosphine and the like; the trialkaryl phosphines, e.g., tritolyphosphine and the like; and the mixed phosphines containing both alkyl and aryl radicals, e.g., dimethylphenylphosphine, ethyldiphenylphosphine and the like and trihydrocarbylphosphites such as the trialkylphosphites, e.g., trimethylphosphite, triethylphosphite, tri-n-butylphosphite, and the like; triarylphosphites, e.g., triphenylphosphite and the like; trialkarylphosphites, e.g., tritolylphosphite and the like; and the mixed phosphites containing both alkyl and aryl radicals, e.g., dimethylphenylphosphite, ethyldiphenylphosphite and the like; the hydrocarbyl dihydrocarbylphosphinites such as the alkyl dialkylphosphinites, e.g., methyl dimethylphosphinite, ethyl diethylphosphinite, propyl dipropylphosphinite, butyl dibutylphosphinite, and the like; the aryl diaryl phosphinites, e.g., phenyl diphenylphosphinite and the like; the alkaryl dialkarylphosphinites, e.g., tolyl ditolylphosphinite and the like; and the mixed phosphinites containing both aryl and alkyl radicals, e.g., ethyl diphenylphosphinite and the like; the dihydrocarbyl hydrocarbylphosphonites such as the dialkyl alkyl phosphonites, e.g., dimethyl methylphosphonite, diethyl ethylphosphonite, dipropyl propylphosphonite, dibutyl butylphosphonite and the like; the diaryl arylphosphonites, e.g., diphenyl phenylphosphonite and the like; dialkaryl alkarylphosphonites, e.g., ditolyl tolylphosphonite and the like; and the mixed phosphonites containing both aryl and alkyl radicals, e.g., dimethyl phenylphosphonite, and the like; the trihydrocarbyl arsines such as the trialkylarsines, e.g., the trimethyl-, triethyl-, tripropyl-, and tributylarsines and the like; the trialkarylarsines, e.g., tritolylarsine and the like; and the mixed arsines containing both alkyl and aryl radicals, e.g., dimethylphenylarsine, ethyldiphenylarsine and the like; the trihydrocarbylstibines, such as the trialkylstibines, e.g., the trimethyl-, triethyl-, tripropyl-, tributylstibines and the like; the tri-arylstibines, e.g., triphenylstibine and the like; the trialkarylstibines, e.g., tritolylstibine and the like; and the mixed stibines containing both alkyl and aryl radicals, e.g., dimethylphenylstibine, ethyldiphenylstibine and the like; the hydrocarbylnitriles, e.g., propionitrile, butyronitrile, valeronitrile, benzonitrile, and the like; the hydrocarbylisonitriles, e.g., propylisonitrile, butylisonitrile, benzylisonitrile and the like.

In addition to the above recited neutral ligands, the Group VIII metals can also contain conventional counter-ions, Y, such as halides, sulfates, carboxylates, alkoxides, and the like. Halides such as chloride and alkoxides such as propoxide are preferred. Counter-ions are noticeably present when co-ordination compounds of rhodium(I), iridium(I) and cobalt(I) are prepared.

The following general formula is illustrative of the bidentate ligands which may be complexed with the Group VIII metals used in the invention:

$$\left( (R^9)_d - C(R^8)_e \overset{\displaystyle -D-(R^{11})_b}{\underset{\displaystyle -D^1-(R^{10})_c}{\vphantom{\Big|}}} \right)_m$$

wherein D and $D^1$ are heteroatoms selected from the group consisting of nitrogen, phosphorus, arsenic and antimony and may be the same or different heteroatoms;

$$[(R^9)_d C(R^8)_e]_n$$

is a bridge linking D and $D^1$; $R^9$ and $R^8$ are hydrogen, hydrocarbyl groups or hydrocarbyloxy groups, or $R^9$ and $R^8$ together can form a monocyclic aliphatic or polycylic ring system with the carbon atom to which they are attached or $R^9$ and/or $R^8$ together with the carbon atom to which they are attached can form monocyclic or polycyclic aliphatic or aromatic ring systems with another bridge-forming carbon atom and its substituents; $d$ and $e$ are independently either 0 or 1, and when the bridge carbon is part of a multiple bond, $d$ and/or $e$ are zero; $n$ is the number of carbon atoms in the bridge and has a value of from 1 to about 4; $m$ is the number of bridges and has a value of 1 or 2, and when $m$ is 2, the bridges need not be the same; $R^{10}$ and $R^{11}$ are either the same or different hydrocarbyl or hydrocarbyloxy groups or $R^{10}$ and/or $R^{11}$ together with one or both of D and $D^1$ and one or more bridge-forming carbon atoms can form a heteromonocyclic or polycyclic ring system, in which case if D or $D^1$ is nitrogen two $R^{10}$ or $R^{11}$ can represent a double bond to D or $D^1$ respectively; $b$ and $c$ are each equal to 3—$m$.

D and $D^1$ are preferably nitrogen, arsenic, or phosphorus. Most preferred are nitrogen and phosphorus because compounds containing them are relatively readily available.

$R^8$, $R^9$, $R^{10}$, and $R^{11}$ may also contain other groups which are unreactive under the conditions of the process, such as hydroxy, cyano, and the like.

Illustrative of some of the bidentate ligands which may be complexed with the Group VIII metals useful in this invention are:

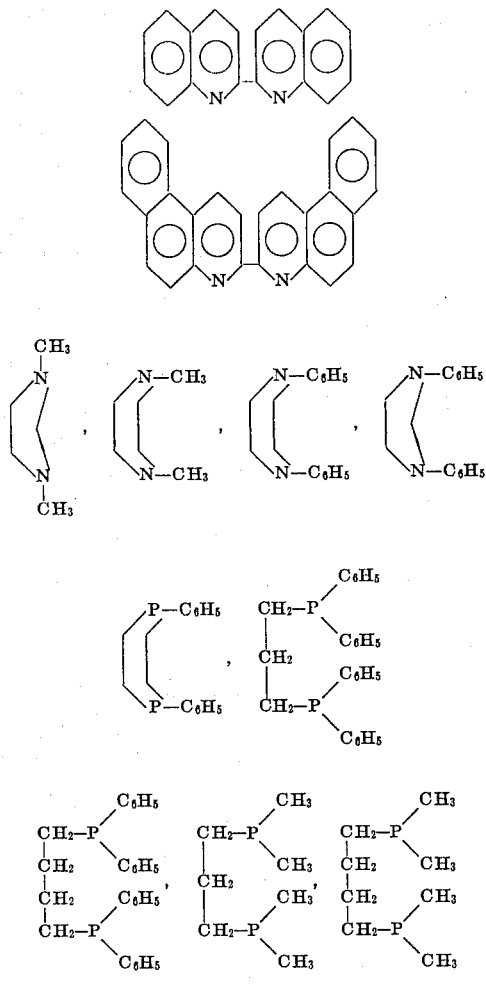

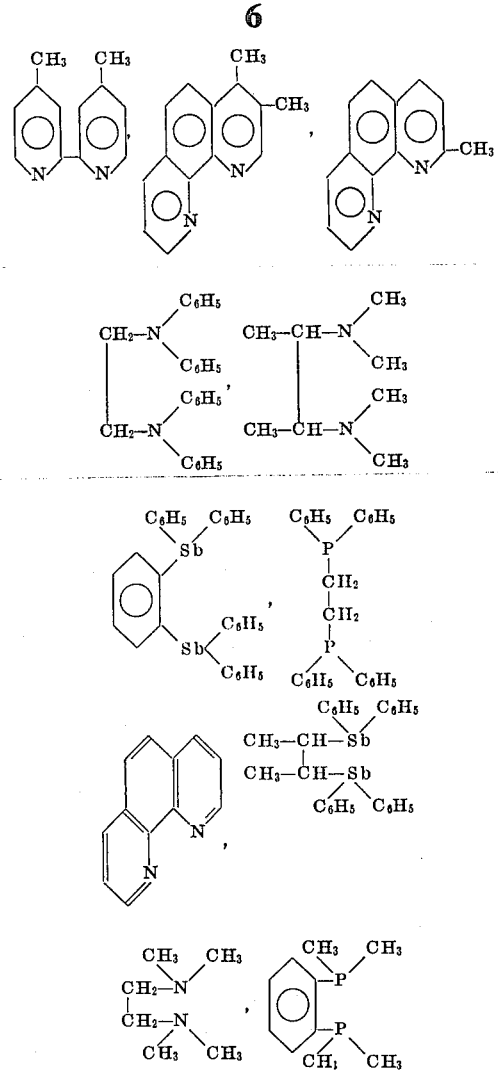

Other ligands which may be co-ordinated to the Group VIII metals are heterocyclic bases and mono- and diolefins which contain up to about eight carbon atoms, e.g., 1,5-cyclooctadiene, norbornadiene, acrylonitrile, maleic anhydride and the like.

As stated above, the ligands may be mono- or polydentates, and where more than one ligand is attached to the metal, the ligands may be the same or different.

Representative soluble co-ordination compounds of various Group VIII metals are tetrakis(triphenylphosphine)palladium(O), tetrakis(triphenylphosphine)platinum(O), chlorocycloocta-1,5-dieneiridium(I) dimer, trans-chlorocarbonylbis(triphenylphosphine)iridium(I), chlorotris(triphenylphosphine)rhodium(I), chloronorbornadienerhodium(I) dimer, chlorocycloocta-1,5-dienerhodium(I) dimer, osmium pentacarbonyl, triosmium dodecarbonyl, tricarbonylbis(triphenylphosphine)ruthenium(O), tricarbonylbis(triphenylarsine)ruthenium(O), iron pentacarbonyl, tricarbonylbis(triethylphosphine)iron(O); $[Co(CO)_3 \, (P—(C_6H_5)_3)_2]^+ \, [Co(CO)_4]^-$ — compounds of this type can be made in situ from the disporportionation of $Co_2(CO)_8$, the readily available form of low valent cobalt, in the presence of suitable ligands; tetrakis(diphenylmethylphosphine)palladium(O), bis(trinaphthylphosphine)palladium(O), tetrakis(phenyldiphenylphosphinite)palladium(O), tetrakis(diethylphenylphosphonite)platinum(O), tetrakis(triphenylarsine)platinum(O), tetrakis(tritolylstibine)platinum(O), bis(triphenylphosphine)(P,P,P,P'-tetraphenyl-1,2-ethylene diphosphine)palladium(O), bis(triphenylphosphine)diphenylacetyleneplatinum(O), tetrakis(triphenylphosphite)nicke l(O), bis(cycloocta-1,5-diene)nickel(O), bis(acrylonitrile)nickel(O), bis(acrylonitrile)bis(triphenylphosphine)nickel(O), and the like.

The reaction can be carried out over a wide temperature range varying from about −50°, or lower, to about 200° C or higher, with a preferred range of about 0° to about 150°. A particularly preferred range is from 20° to about 140°.

The reaction can be run in the liquid phase and it is a matter of choice whether or not a solvent is to be used. If the reactants are not to be combined neat, then an inert solvent such as benzene, toluene, ether, dioxane and the like should be used.

Pressure does not appear to be narrowly critical and the reaction can be run at pressures above or below atmospheric with the only criterion being that the reactants remain in the liquid phase.

The reaction is preferably carried out by reacting a stoichiometric amount or greater of the aryl halide with the metal or metal compound at temperatures between 80° or lower and 135° C, or higher.

The reaction can be carried out in conventional equipment because the reaction conditions are not severe. Glass and stainless steel reaction vessels can be used while the reaction is carried out in either a batchwise or continuous fashion.

This invention is particularly useful for the preparation of halo(aryl) compounds of nickel(II), palladium(II) and platinum(II) especially the complexes of palladium(II). The palladium(II) complexes manufactured by this process are useful intermediates in the arylation of olefins and also as active forms of catalysts for the catalytic oxidation of methylbenzenes to useful benzyl derivatives.

The following examples are illustrative.

EXAMPLE 1

A solution of 2.3 grams of tetrakis(triphenylphosphine)palladium(O) and 15 milliliters of benzene was prepared and to which was added 1 gram of 2-nitrophenyl chloride. The mixture was heated to 100° C in a sealed tube under nitrogen overnight. The reaction mixture was cooled and then stripped on a Büchi Rotovaptor and the resulting solid was triturated with ether. The chloro(2-nitrophenyl)bis(triphenylphosphine)palladium(II) was further purified by recrystallization from methylene chloride-hexane and was produced in a 94 percent yield with a decomposition temperature of 215°–217° C.

EXAMPLE 2

A solution of 2.3 grams of tetrakis(triphenylphosphine)palladium(O) and 15 milliliters of benzene was prepared and to which was added one gram of 3-nitrophenyl chloride. The mixture was heated to 135° C in a sealed tube under nitrogen overnight the reaction mixture was cooled and then stripped on a Büchi Rotovaptor and the resulting solid was triturated with ether. The chloro(3-nitrophenyl)bis(triphenylphosphine)palladium(II) was further purified by recrystallization from benzene and was produced in an 86 percent yield with a decomposition temperature of 200°–206° C.

EXAMPLE 3

A solution of 2.3 grams of tetrakis(triphenylphosphine)palladium(O) and 15 milliliters of benzene was prepared and to which was added one gram of 4-nitrophenyl chloride. The mixture was heated to 100° C in a sealed tube under nitrogen overnight. The reaction mixture was cooled and then stripped on a Büchi Rotovaptor and the resulting solid was triturated with ether. The chloro(4-nitrophenyl)bis(triphenylphosphine)palladium(II) was further purified by recrystallization from methylene chloride-hexane and was produced in an 86 percent yield with a decomposition temperature of 193°–196° C.

EXAMPLE 4

A solution of 2.3 grams of tetrakis(triphenylphosphine)palladium(O) and 15 milliliters of benzene was prepared and to which was added one gram of 2-cyanophenyl chloride. The mixture was heated to 135° C in a sealed tube under nitrogen overnight. The reaction mixture was cooled and then stripped on a Büchi Rotovaptor and the resulting solid was triturated with ether. The chloro(2-cyanophenyl)bis(triphenylphosphine)palladium(II) was further purified by recrystallization from benzene and was produced in an 85 percent yield with a decomposition temperature of 180°–183° C.

EXAMPLE 5

A solution of 2.3 grams of tetrakis(triphenylphosphine)palladium(O) and 15 milliliters of benzene was prepared and to which was added one gram of 4-cyanophenyl chloride. The mixture was heated to 100° C in a sealed tube under nitrogen overnight. The reaction mixture was cooled and then stripped on a Büchi Rotovaptor and the resulting solid was triturated with ether. The chloro(4-cyanophenyl)bis(triphenylphosphine)palladium(II) was further purified by recrystallization from methylene chloride-hexane and was produced in a 97 percent yield with a decomposition temperature of 224°–226° C.

EXAMPLE 6

A solution of 2.3 grams of tetrakis(triphenylphosphine)palladium(O) and 15 milliliters of benzene was prepared and to which was added one gram of 4-carbomethoxyphenyl chloride. The mixture was heated to 135° C in a sealed tube under nitrogen overnight. The reaction mixture was cooled and then stripped on a Büchi Rotovaptor and the resulting solid was triturated with ether. The chloro(4-carbomethoxyphenyl)bis(triphenylphosphine)palladium(II) was further purified by recrystallization from benzene and was produced in an 83 percent yield with a decomposition temperature of 178°–182° C.

EXAMPLE 7

A solution of 2.3 grams of tetrakis(triphenylphosphine)palladium(O) and 15 milliliters of benzene was prepared and to which was added one gram of 4-trifluoromethylphenyl chloride. The mixture was heated to 135° C in a sealed tube under nitrogen overnight. The reaction mixture was cooled and then stripped on a Büchi Rotovaptor and the resulting solid was triturated with ether. The chloro(4-trifluoromethylphenyl)bis(triphenylphosphine)palladium(II) was further purified by recrystallization from methylene chloridehexane and was produced in an 89 percent yield with a decomposition temperature of 210°–220° C.

EXAMPLE 8

A solution of 2.3 grams of tetrakis(triphenylphosphine)palladium(O) and 15 milliliters of benzene was prepared and to which was added one gram of 4-chlorophenyl chloride. The mixture was heated to 135° C in a sealed tube under nitrogen overnight. The reaction mixture was cooled and then stripped on a Büchi Rotovaptor and the resulting solid was triturated with ether. The chloro(4-chlorophenyl)bis(triphenylphosphine)palladium(II) was further purified by recrystallization from benzene and was produced in a 92 percent yield with a decomposition temperature of 215°–220° C.

EXAMPLE 9

A solution of 2.3 grams of tetrakis(triphenylphosphine)palladium(O) and 15 milliliters of benzene was prepared and to which was added one gram of 4-chlorophenyl bromide. The mixture was heated to 135° C in a sealed tube under nitrogen overnight. The reaction mixture was cooled and then stripped on a Büchi Rotovaptor and the resulting solid was triturated with ether. The bromo(4-chlorophenyl)bis(triphenylphosphine)palladium(II) was further purified by recrystallization from methylene chloride-hexane and was produced in a 78 percent yield with a decomposition temperature of 195°–196° C.

EXAMPLE 10

A solution of 2.3 grams of tetrakis(triphenylphosphine)palladium(O) and 15 milliliters of benzene was prepared and to which was added one gram of 2,4-dinitrophenyl chloride. The mixture was heated to 80° C in a sealed tube under nitrogen overnight. The reaction mixture was cooled and then stripped on a Büchi Rotovaptor and the resulting solid was triturated with ether. The chloro(2,4-dinitrophenyl)bis(triphenylphosphine)palladium(II) was further purified by recrystallization from benzene and was produced in a 90 percent yield with a decomposition temperature of 218°–221° C.

EXAMPLE 11

A solution of 2.3 grams of tetrakis(triphenylphosphine)palladium(O) and 15 milliliters of benzene was prepared and to which was added one gram of 4-benzoylphenyl chloride. The mixture was heated to 135° C in a sealed tube under nitrogen overnight. The reaction mixture was cooled and then stripped on a Büchi Rotovaptor and the resulting solid was triturated with ether. The chloro(4-benzoylphenyl)bis(triphenylphosphine)palladium(II) was further purified by recrystallization from methylene chloride-hexane and was produced in an 89 percent yield with a decomposition temperature of 195°–198° C.

EXAMPLE 12

A solution of 2.3 grams of tetrakis(triphenylphosphine)palladium(O) and 15 milliliters of benzene was prepared and to which was added one gram of 4-acetylphenyl bromide. The mixture was heated to 135° C in a sealed tube under nitrogen overnight. The reaction mixture was cooled and then stripped on a Büchi Rotovaptor and the resulting solid was triturated with ether. The bromo(4-acetylphenyl)bis(triphenylphosphine)palladium(II) was further purified by recrystallization from benzene and was produced in a 93 percent yield with a decomposition temperature of 180°–183° C.

EXAMPLE 13

The compound, 2-acetylphenyl bromide, in a one gram quantity, is added to a solution of 2.3 grams of tetrakis(triphenylphosphine)nickel(O) in 15 milliliters of benzene. The mixture is heated at 60° C overnight in a sealed tube under nitrogen. The reaction mixture is cooled and then stripped on a Büchi Rotovaptor and the resulting solid is triturated with ether. After recrystallization from chloroform-hexane, bromo(2-acetylphenyl)bis(triphenylphosphine)nickel(II) is recovered in a 90 percent yield.

EXAMPLE 14

One gram of 2-nitrochlorobenzene is added to a solution of 2.3 grams of tetrakis(methyldiphenylphosphinite)nickel(O) in 15 milliliters of benzene. After heating at 40° C overnight in a sealed tube under nitrogen, the solution is stripped on a Büchi Rotovaptor and the resulting solid is triturated with ether. An 85 percent yield of chloro-(2-nitrophenyl)bis(methyldiphenylphosphinite)nickel(II) result appears after recrystallization from methylene chloride-hexane.

EXAMPLE 15

One gram of 4-nitrochlorobenzene is added to a solution of 2.3 grams of tetrakis(triphenylphosphine)platinum(O) in 15 milliliters of benzene and the mixture is heated at 110° C overnight in a sealed tube under nitrogen. After cooling, the mixture is stripped on a Büchi Rotovaptor, and the resulting solid is triturated with ether. A 90 percent yield of chloro(4-nitrophenyl)bis(triphenylphosphine)platinum(II) is recrystallized from chloroform-hexane.

What is claimed is:

1. A method for producing a halo (aryl) palladium (II) complex having the following structural formula:

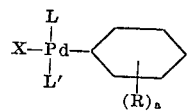

wherein X is selected from the group consisting of chlorine, bromine, and iodine; L and L' are the same or different monodentate or bidentate ligands containing phosphorus in the form of phosphine, phosphinite, phosphonite or phosphite radicals, each ligand having up to 36 carbon atoms; $a$ is an integer from 1 to 5 and R is a radical selected from the group consisting of hydrogen, alkyl, alkoxy, aryloxy, amino, nitro, nitroso, cyano, carbonyl, carboalkoxy, carboxamide, N,N-dialkylcarboxamide, N,N-diarylcarboxamide, aryl, aroyl, and halo wherein each R radical can be the same or different with the proviso that the net effect of the R radicals is to lower the electron density of the ring comprising reacting a palladium (O) complex which will provide the ligands defined above with an aryl halide having the following structural formula:

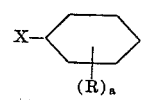

wherein X, R, and $a$ are as defined above.

2. The method of claim 1 wherein said ligand is triphenylphosphine.

3. The method of claim 1 wherein said aryl halide contains nitro groups.

4. The method of claim 1 wherein said aryl halide contains nitrile groups.

5. The method of claim 1 wherein said aryl halide contains additional halo groups.

6. The method of claim 1 wherein said aryl halide contains carboalkoxy or carboaryloxy groups.

7. The method of claim 1 wherein said aryl halide contains alkanoyl or aroyl groups.

8. A complex having the following structural formula:

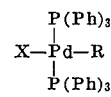

wherein X is selected from the group consisting of chlorine, bromine and iodine and R is selected from the group consisting of

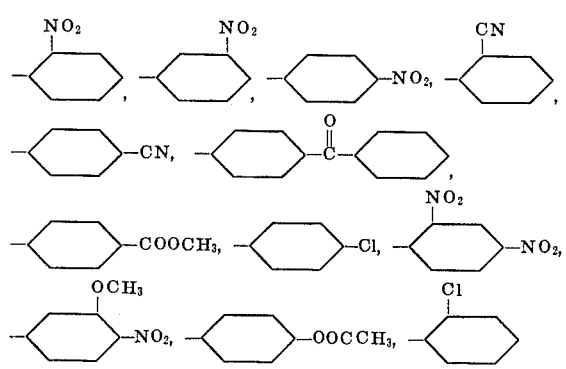

9. A complex according to claim 8 wherein X is chlorine and R is

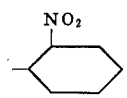

10. A complex according to claim 8 wherein X is chlorine and R is

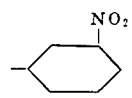

11. A complex according to claim 8 wherein X is chlorine and R is

12. A complex according to claim 8 wherein X is chlorine and R is

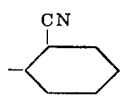

13. A complex according to claim 8 wherein X is chlorine and R is

14. A complex according to claim 8 wherein X is chlorine and R is

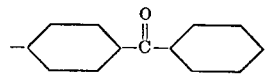

15. A complex according to claim 8 wherein X is chlorine and R is

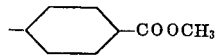

16. A complex according to claim 8 wherein X is chlorine and R is

17. A complex according to claim 8 wherein X is chlorine and R is

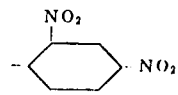

18. A complex according to claim 8 wherein X is chlorine and R is

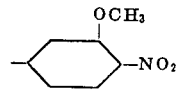

19. A complex according to claim 8 wherein X is bromine and R is

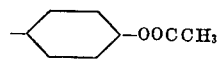

20. A complex according to claim 8 wherein X is bromine and R is

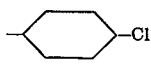

21. A complex according to claim 8 wherein X is bromine and R is

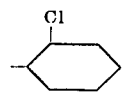

22. A complex according to claim 8 wherein X is iodine and R is

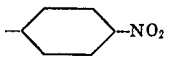

* * * * *